June 9, 1953
C. W. CHANDA
2,641,336
INDUSTRIAL TRUCK
Filed Jan. 10, 1952
4 Sheets-Sheet 1
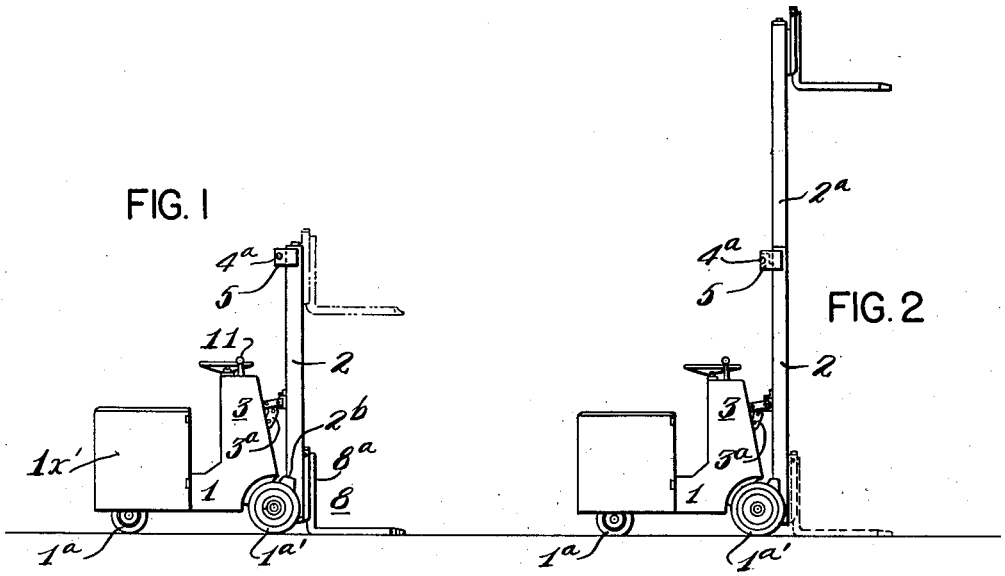
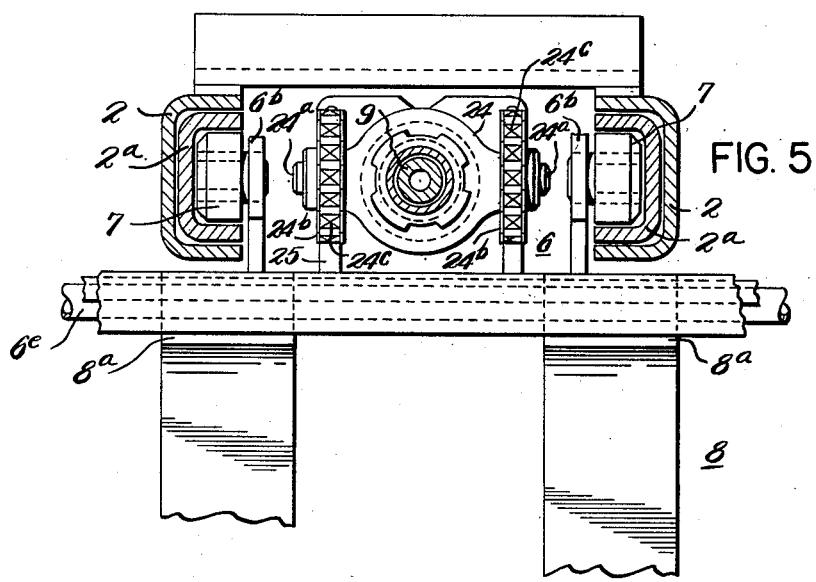
INVENTOR.
CLARENCE W. CHANDA
BY
Geo. B. Bitts
ATTORNEY

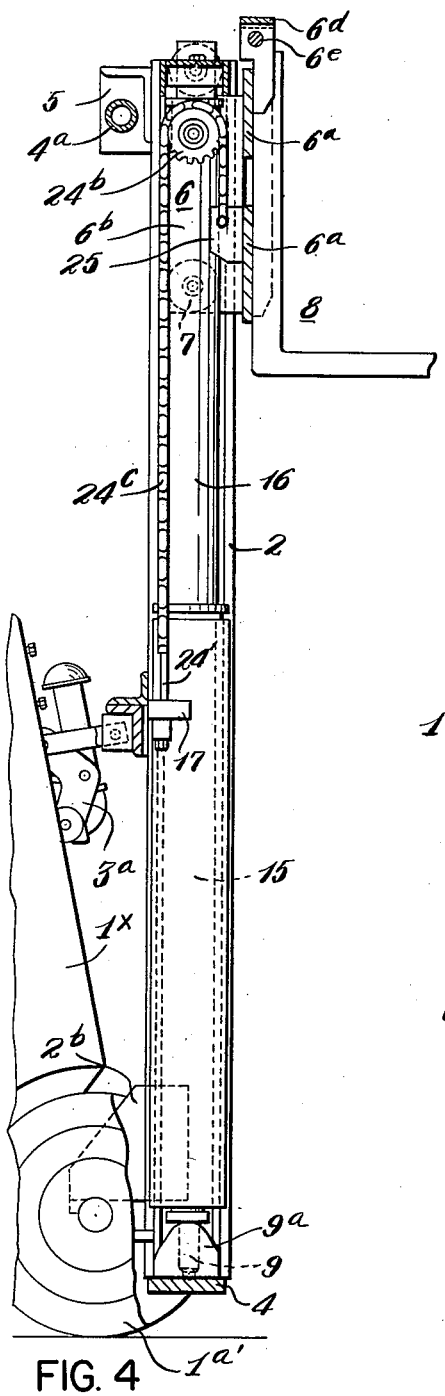

June 9, 1953  C. W. CHANDA  2,641,336
INDUSTRIAL TRUCK
Filed Jan. 10, 1952  4 Sheets-Sheet 3

INVENTOR.
BY CLARENCE W. CHANDA
ATTORNEY

June 9, 1953  C. W. CHANDA  2,641,336
INDUSTRIAL TRUCK
Filed Jan. 10, 1952  4 Sheets-Sheet 4
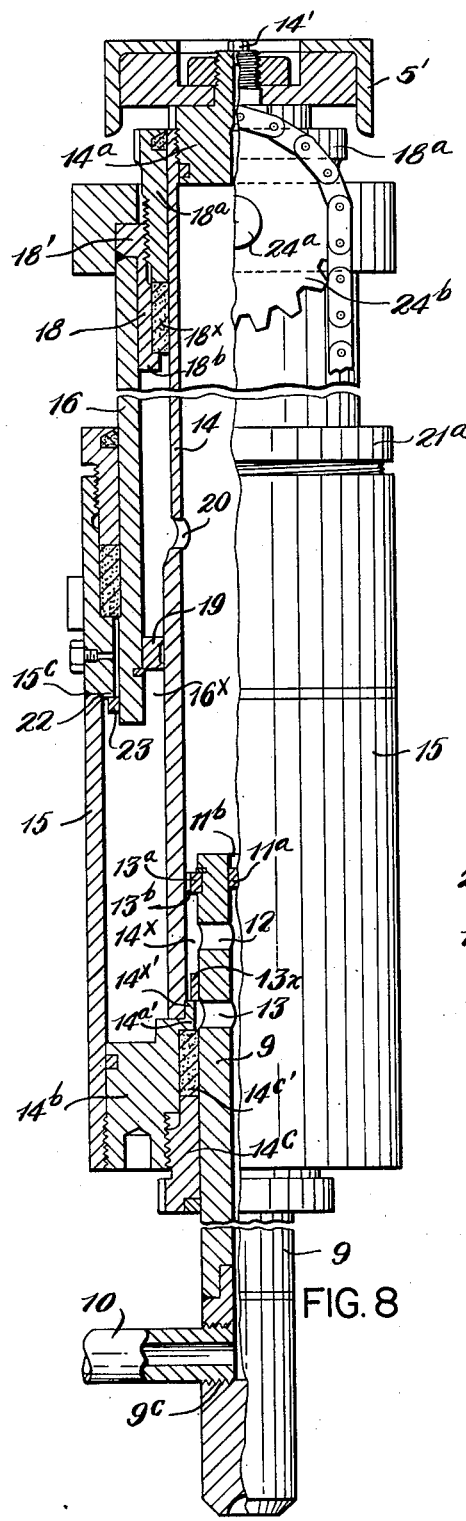
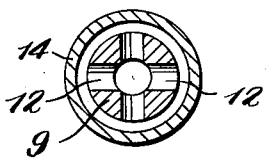
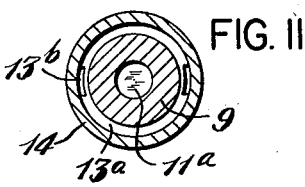
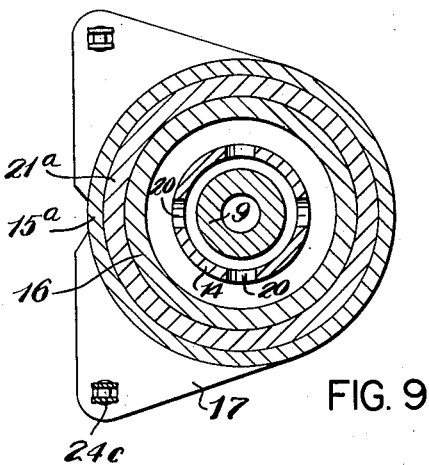
INVENTOR.
CLARENCE W. CHANDA
BY
ATTORNEY Patented June 9, 1953

2,641,336

UNITED STATES PATENT OFFICE 2,641,336

INDUSTRIAL TRUCK

Clarence W. Chanda, Cleveland, Ohio, assignor to The Baker-Raulang Company, Cleveland, Ohio, a corporation of Ohio Application January 10, 1952, Serial No. 265,834

6 Claims. (Cl. 187—9)

This invention relates to an industrial truck having upwardly extending guides for a support which is moved by suitable power means along the guides and provided with a carrier for handling loads, that is, picking up loads at different levels, transporting them and discharging the loads on a support or in stacked relation. The guides consist of spaced main members mounted on the truck frame and secondary members, each slidably mounted on one of the main members. In the preferred arrangement, the secondary guide members, when in their normal or lowest position, do not extend above the upper ends of the main guide members. For reasons later set forth, the main and secondary guide members terminate at a certain height or level, so as not to exceed the lowest overhead limit (such as rooms or storage warehouses having low ceilings or balconies, box cars, cargo planes, trailers, doors, doorways and archways having a low overhead sill or wall) within the area where the truck is to be operated and driven.

The invention includes an improved fluid pressure operated mechanism adapted, by operation of a valve, to raise the support to and from a predetermined level relative to and independently of the guide members and thereafter raise both the secondary guide members and support, whereby the load carrier is raised to and from selected levels within the limit of movement of the secondary guide members. It will thus be seen that the truck adapts itself to loading and unloading box cars, in areas having low ceilings and translation through doorways, as well as where overhead conditions permit operations, such as stacking and de-stacking loads at higher levels.

The invention includes an improved fluid operated mechanism for raising the support for the load carrier wherein the supply of fluid pressure is directly connected to the fluid operated mechanism independently of the movable support, whereby all flexible conduits, such as hose, adapted to move with or relative to the support or its raising means, are eliminated.

One object of the invention is to provide in an industrial truck having main guide members mounted on the truck frame and secondary guide members mounted on the main guide members and a support having a load carrier, movable endwise of the guide members, improved fluid pressure operated means associated with the guide members and operatively connected to the support and secondary guide members and arranged to initially raise the support a predetermined distance and thereafter raise the secondary guide members and the support to a higher level.

Another object of the invention is to provide improved fluid pressure operated means for raising the elevating support on an industrial truck consisting of a plurality of concentrically related, relatively movable members certain of which are respectively connected to the secondary guide members and support for co-ordinated relative movement to initially raise the support relative to the secondary guide members and thereafter raise the secondary guide members, whereby the load carrier on the support may be operated to meet various overhead conditions.

Another object of the invention is to provide improved fluid pressure operated means for operating the support on an industrial truck, consisting of relatively movable, telescopically related elements, one of which is connected to the secondary guide members, operable (a) to raise and lower the support to various levels within a predetermined height while the secondary guide members remain stationary in their lowest or normal position and (b) to raise both the secondary guide members and support to and from levels above the predetermined height or level.

A further object of the invention is to provide an improved fluid operated mechanism for raising the load carrier on a truck to selected levels and consisting of piston-cylinder couples, wherein provision is made, upon movement of the carrier to its highest level, to prevent a fluid-lock, whereby upon release of the fluid pressure, the flow of the fluid is reversed to permit downward movement of the carrier.

A still further object of the invention is to provide an improved fluid operated mechanism for raising the load carrier on a truck to selected positions comprising a plurality of concentric cylindrical elements forming piston-cylinder-couples, one of said elements being employed to raise the carrier a predetermined distance and thereafter said element and another element are employed to raise the carrier and its guides.

A further object of the invention is to provide improved fluid pressure operated means for raising the support for a load carrier on an industrial truck, of simplified and readily controlled construction.

Other objects of the invention will be apparent to those skilled in the art to which my invention relates from the following description taken in connection with the accompanying drawings, wherein Fig. 1 is a side elevation of an industrial truck, shown somewhat diagrammatically, having a lift mechanism embodying my invention, the load carrier being shown in dotted lines at that level to which it may be raised independently of the guides;

Fig. 2 is a view similar to Fig. 1, but showing in full lines the load carrier raised to its highest level;

Fig. 3 is a front elevation of the truck shown in Fig. 1, enlarged, the load carrier being shown in its lowest or normal position; parts being broken away;

Fig. 4 is a section on the line 4—4 of Fig. 3, the load carrier being shown at that level to which it may be moved independently of the guides;

Fig. 5 is a fragmentary section substantially on the line 5—5 of Fig. 3, enlarged;

Figure 6:
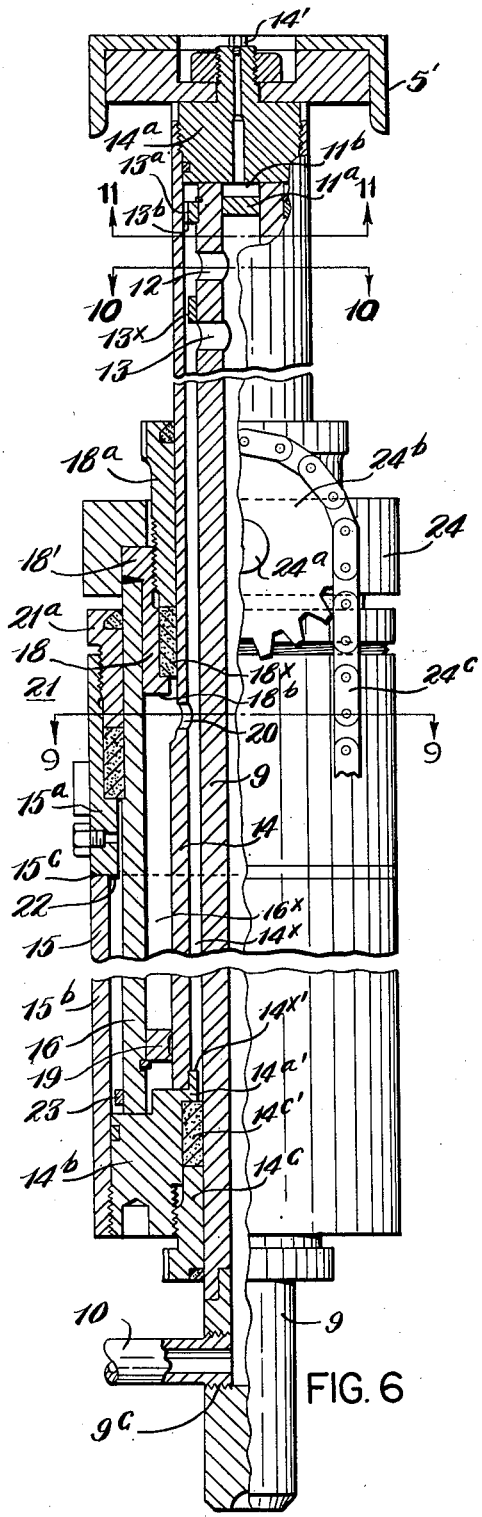
Fig. 6 is an elevation of the fluid pressure operated mechanism, parts being broken away and shown in normal position; that position when the carrier is at the level shown in Fig. 3.
Figure 7:
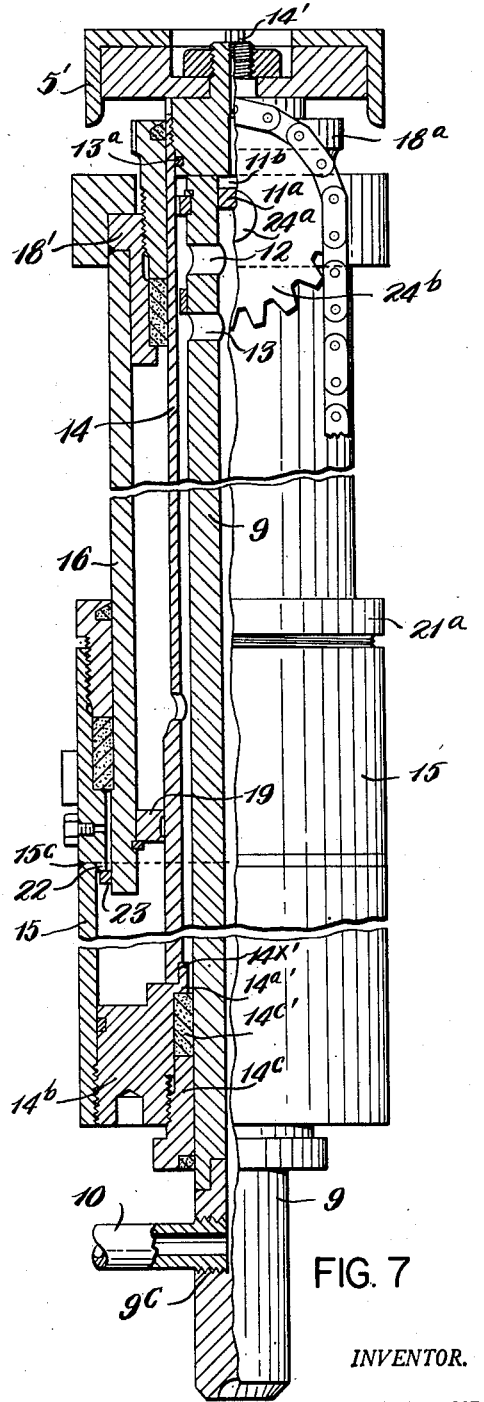
Fig. 7 is a view similar to Fig. 6, but showing the position of the parts when the load carrier is at the level shown in Fig. 4.

Fig. 8 is a view similar to Figs. 6 and 7, but showing the position of the parts when the load carrier is at the level shown in Fig. 2; and Figs. 9, 10 and 11 are sections on the lines 9—9, 10—10 and 11—11, respectively, of Fig. 6.

In the drawings, 1 indicates as an entirety a truck mounted on power driven and steerable wheels 1a, 1a', respectively, and provided with spaced main guides 2 and extensible or secondary guides 2a, telescopically related to and slidably engaging the main guides 2, respectively, (see Fig. 5) for movement endwise thereof. The guides 2, 2a, are adapted to be tilted inwardly by a suitable mechanism 3 which is connected to the guides 2 by an angle 3a. The tilting mechanism forms no part of the present invention, for which reason it is not illustrated in detail. The main guides 2 are provided on their outer sides with plates 2b, which extend inwardly and are pivotally supported on the truck in any desired manner. The lower ends of the guides 2 are fixed to a base 4 and connected together at their upper ends by a cross member 4a having support at its opposite ends in brackets 5 extending inwardly from the guides 2. The extensible guides 2a are connected together at their upper ends by a pair of members 5'.

The support or elevating member, indicated as an entirety at 6, consists of the following: 6a indicates a pair of upper and lower cross plates having rearwardly extending members 6b. Each member 6b supports upper and lower stud shafts on which are mounted rollers 7 having rolling engagement with inner sides of the extensible guides 2a, as later set forth. The cross plates 6a support a frame consisting of side plates 6c connected at their upper ends by a bar 6d and a rod 6e supported at its opposite ends by the side plates 6c. The elevating member 6 supports a load carrier 8, shown for illustrative purposes as consisting of a pair of forks the upright legs 8a of which are adjustably mounted on the rod 6e for movement toward or from each other.

The fluid pressure operated means consist of the following: 9 indicates a hollow or tubular member mounted at its lower end on the base 4 and extends upwardly therefrom to approximately the height of the guides 2 (see Fig. 3). The member 9 is axially related to and slidably supports a plurality of telescopically related, relatively movable piston-cylinder couples (later referred to). The member 9 is preferably hollow to form a passage for the fluid leading to one of the cylinders, as later set forth, to simplify the construction. The lower end portion of the member 9 is disposed between a pair of plates 9a fixed to the base 4 and its end is recessed to engage a ball 9b seated in a recess formed in the base 4. Inwardly of its lower end the member 9 is formed with a screw threaded inlet opening 9c in which the outer end of a supply pipe 10 is mounted. The supply pipe leads from a source of supply of fluid under pressure (such as oil) consisting of a pump operated by a suitable motor, which is controlled by a lever 11, the intake of the pump being connected with a sump (not shown).

A lever 11, which operates a valve (not shown) mounted in a housing 1x, serves to control the supply of fluid to and through the pipe 10. The pump, sump and the fluid connections therefor are mounted in a housing 1x'. The pump, sump and valve are of well known construction, for which reasons illustrations of these parts are omitted. The upper end portion of the hollow member 9 is closed by an end wall 11a. The wall 11a is disposed below the upper end of the member 9 to provide a space 11b above the wall. Below the wall 11a the member 9 is formed with upper and lower openings 12, 13, through which the fluid flows into the adjacent cylinder. 13x indicates a ring fixed to the outer wall of the member 9, preferably between the openings 12, 13, to provide a stop, as later set forth.

14, 15 and 16 indicate, respectively, inner, outer and intermediate cylindrical members, the outer member 15 being provided exteriorly and intermediate its ends with anchors 17 (see Figs. 3, 4 and 9) to which reference will later be made. The upper end of the inner member 14 is closed by an end wall 14a, having a bleeder duct for the space 11b closed by a plug 14'. The wall 14a is in engagement with the members 5' and through the latter it operates to raise the extensible guides 2a when the inner member 14 is operated upwardly. 13a indicates a ring fixed to the outer wall of the hollow member 9 below its upper end. The ring 13a serves as a spacer between the member 9 and cylinder 14 and a guide for the latter during endwise movement thereof, as later set forth. The outer wall of the ring 13a is formed with grooves or slots 13b (see Fig. 11) through which the fluid flows to apply pressure to the wall 14a whereby the cylinders 14, 15, move endwise as a unit. The lower end of the inner member 14 is fixedly connected to an annulus 14a' which is integrally provided at its outer end with a ring 14b having screw threaded connection with the lower end of the outer member 15. The inner wall of the ring 14b is provided with screw threads engaged by the ring nut 14c for a gland 14c', which co-operates with the ring 13a to provide a fluid space 14x between the member 9 and cylinder 14. As shown in Figs. 6, 7 and 8, the annulus 14a' extends inwardly beyond the inner wall of the cylinder 14 to provide an annular shoulder 14x' which, in the upward movement of the cylinders 14 and 15, engages the ring 13x, whereby the latter limits the raising of the cylinders 14, 15. 18 indicates a collar fitting within the upper end of the intermediate cylinder 16 and having at its upper end an external flange 18' welded to the upper end of the cylinder 16. The inner wall of the collar 18, adjacent its upper end, is provided with screw threads which are engaged by the ring nut 18a of a gland 18x. The gland 18x co-operates with a ring 19, suitably fixed to the inner wall of the cylinder 16 to provide a flow space 16x between the cylinders 14, 16. 20 indicates a port formed in the wall of the cylinder 14 to provide for flow of the fluid under pressure from the flow space 14x into the flow space 16x. The port 20 is disposed below the collar 18, when the cylinders are in normal position, as shown in Fig. 6 (that is, when carrier 8 is at its lowest level as shown in Fig. 3), so that the supplied fluid pressure is applied to the lower end of the collar 18 and the latter serves as a piston to raise the cylinder 16, relative to the cylinders 14, 15 (see Fig. 7). By preference, the inner end of the collar 18 is provided with an inwardly extending shoulder 18b which increases the piston area and insures the initial movement of the cylinder 16 as later set forth. 21 indicates a suitable gland between upper end of the cylinder 15 and cylinder 16, the ring nut 21a of the gland having screw threaded engagement with the inner wall of the cylinder 15.

The cylinder 15 preferably consists of two endwise related upper and lower cylindrical sections 15a, 15b, the wall of the upper section 15a being somewhat thicker than the wall of the lower section 15b, and the lower end of the upper section 15a being rabbeted to provide a seat for the upper end of the lower section 15b, the adjacent ends being welded together as shown at 15c. In this arrangement, an annular shoulder 22 is provided on the inner wall of the cylinder 15 to form a stop in the path of movement of a ring 23 fixed to the outer wall of the intermediate cylinder 16 to limit the upward movement of the latter relative to the cylinders 14, 15.

The cylinder 16 is longer than the cylinder 15 so as to extend beyond the upper end of the latter and the flange 18' of the collar 18 provides a seat for a cross-head 24 surrounding the gland 18x, the inner wall of the cross-head being annularly recessed to engage the side and top walls of the flange 18'. As shown in Fig. 5, the cross-head 24 is provided with diametrically related extensions terminating in stud shafts 24a disposed on an axis parallel to and preferably in the plane of the axes of the rollers 7, the shafts 24a mounting freely rotatable reeving devices 24b, which are engaged by a pair of flexible members 24c, preferably consisting of chains. As shown in Fig. 5, the reeving devices 24b consist of sprockets, but, if desired, the devices 24b may have plain peripheral side walls since the side bars of each of the chains 24c overlap the sides of the adjacent device 24b to prevent displacement of the chains. It is to be understood, however, that the invention is not to be limited to a chain as a wire cable and suitable reeving elements therefor, could be employed when found desirable. As shown in Figs. 3 and 4, the chains 24c engage the reeving devices intermediate their ends, the inner runs of the chains being connected through adjustable elements 24' to the anchors 17 and their outer runs being connected to brackets 25 extending rearwardly from the lower cross plate 6a of the elevating member 6.

From the foregoing description it will be observed that the inner and outer members 14, 15, are connected together and that the inner member 14 is in connected relation with the extensible guides 2a, whereas the intermediate member 16 is connected through the reeving devices 24b and flexible members 24c to the elevating member.

Operation: With the elevating member 6 in its lowest position, as shown in Figs. 1 and 3, operation of the control valve by lever 11' to one position will supply fluid pressure to and through the tubular member 9 but as the upper end of the latter is closed, the fluid pressure is directed through the communicating ports or openings 12, 13, into the space 14x and through port or opening 20 into the space 16x to apply pressure to collar 18, the effect of which is to move the cylinder 16 upwardly relative to cylinders 14, 15, and guides 2, 2a, this relative movement continuing so long as the valve is maintained in its operated position, but limited by the engagement of the ring 23 with the stop 22, as shown in Fig. 7. As the cylinder 16 supports the reeving devices 24b, the upward movement of the latter will impart upward pull on the chains 24c. As the inner ends of the chains are fixed to the anchors 17 and their outer ends are connected to the elevating member 6, the latter will be moved upwardly on the secondary guides 2a and raise the load carrier 8 to the position shown in dotted lines in Fig. 1 and in full lines in Fig. 4. It will be observed that the load carrier may be moved to and from the position just referred to or to and from any position therebelow independently of the guides 2a, and hence the truck may be driven through openings having a low overhead and carry out loading and unloading operations in box cars, cargo planes and trailers, as well as areas having low ceilings. In raising the elevating member 6 to any selected position, it may be maintained at that level by moving the valve to its neutral or closed position; and by operating the valve to its other position it will relieve the fluid pressure, so that the cylinder 16, elevating member 6, load carrier 8 and any load thereon will gravitate to their normal position and the fluid will flow reversely through ports 20, 12, 13, tubular member 9 and valve to the sump.

Where the overhead conditions permit the load carrier 8 may be raised to and from the position or level shown in Fig. 2 or to and from any intermediate level therebelow. In raising the elevating member 6 and carrier 8 to a level above that shown in Fig. 4, the control valve is maintained in its first operated position until the selected level is reached. In carrying out this operation the applied fluid pressure initially moves the cylinder 16 upwardly until the ring 23 engages the stop 22, thus limiting further upward movement of the cylinder 16 relative to cylinders 14, 15 (the load carrier moving upwardly to the predetermined level independently of the secondary guides as already set forth); and following such engagement of the ring 23 with stop 22, if the control valve is maintained opened, the fluid pressure is applied to the end wall 14a and collar 18. As the load carrier 8 has been moved to the upper ends of the guides 2a, the applied pressure to the wall 14a and collar 18 will move the cylinders 14, 15 and 16 and secondary guides 2a upwardly as a unit to any selected position or level within the limit of upward movement of the secondary guides 2a, such limit being preferably controlled by the engagement of the shoulder 14x' with the ring 13x.

It will be noted that I form in the tubular member 9 longitudinally thereof, a plurality of flow openings or ports, preferably two ports 12 and 13, which insures an adequate supply of fluid pressure to the chambers or spaces 14x, 16x. However, when the carrier 8 is raised to its uppermost position, as shown in Fig. 2, the opening 13 is closed off by the annulus 14a', but the opening 12 is in communication with chambers 14x, 16x; accordingly, upon operation of the control valve by the lever 11' to relieve the fluid pressure and permit gravitation of elevating member and parts carried thereby, initial reverse flow of the fluid takes place through opening 12, so that danger of an oil-lock preventing such gravitational movement is avoided.

It will be observed from the foregoing description that I provide a stationary fluid pressure supply member and three concentric members surrounding the supply member. In this arrangement the intermediate cylinder 16 initially moves upwardly relative to the inner and outer cylinders 14, 15, to raise the carrier 8 independently of the guides 2a and thereafter the both cylinders 14 and 16 operate as pistons to raise the elevating member, load carrier, cylinder 15 and secondary guides, as well as any load on the carrier. It will be appreciated that in the second stage movement of the load carrier to the higher level the increased weight of these parts is overcome by simultaneously applying the fluid pressure to wall 14a of the inner cylinder 14 and collar 18 on the intermediate cylinder 16.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A truck having, in combination, main upright guides mounted on the truck frame, secondary guides slidably mounted on said main guides, a support slidably mounted on said secondary guides and provided with a load carrier, and a fluid operated mechanism for raising said support independently of said secondary guides to position said carrier at selected levels within a predetermined height and thereafter raise said support and secondary guides to position said carrier at selected levels above the predetermined height, said mechanism consisting of a vertically disposed tubular member mounted on said truck frame and closed at its upper end, inner, outer and intermediate cylinders surrounding said member, spacing devices between said tubular member and said inner cylinder and between said inner cylinder and said intermediate cylinder, said member and said inner cylinder being formed with ports providing fluid communication to the spaces between said member and cylinders, said inner cylinder being closed by a wall at its upper end and connected at its upper end to said secondary guides and at its lower end to the adjacent end of the outer cylinder, whereby said inner and outer cylinders are movable endwise as a unit on said tubular member and said intermediate cylinder being provided adjacent its upper end with a collar, operating connections between said intermediate cylinder and said support for raising the latter to the predetermined height, a source of supply of fluid under pressure having a valve controlled connection with said tubular member for supplying fluid thereto for flow through said member and through said ports, the supplied pressure on said collar serving to initially move said intermediate cylinder upwardly and move said carrier independently of said secondary guides to a predetermined level and thereafter the supplied pressure on the end wall for said inner cylinder and said collar serving to move all of said cylinders and said secondary guides upwardly to raise said carrier to selected higher levels.

2. A truck as claimed in claim 1 wherein the outer wall of said tubular member adjacent its upper end is provided with a stop and the opposed wall of said inner cylinder adjacent its lower end is provided with a shoulder arranged to engage said stop in the upward movement of said inner cylinder to limit the movement of the latter.

3. A truck as claimed in claim 1 wherein the inner wall of said outer cylinder adjacent its upper end is provided with a stop and the opposed wall of said intermediate cylinder is provided with a shoulder arranged to engage said stop in the upward movement of said intermediate cylinder to limit the movement of the latter.

4. A truck as claimed in claim 2 wherein said tubular member is formed with upper and lower ports through which the fluid flows and said stop is mounted on the tubular member between said ports to prevent shutting off said upper port, whereby, upon relief of fluid pressure, the fluid in the spaces between said cylinders flows therefrom to said tubular member to initially permit the gravitation of said support and parts mounted thereon.

5. A truck having, in combination, main upright guides mounted on the truck frame, secondary guides slidably mounted on said main guides, said guides terminating at their upper ends at a predetermined height, a support slidably mounted on said secondary guides and provided with a load carrier, and a fluid operated mechansim for raising said support the full length of said secondary guides and thereafter raise said support and secondary guides relative to said main guides, said mechanism consisting of a vertically disposed tubular member mounted on said truck frame and closed by a wall at its upper end, inner, outer and intermediate cylinders surrounding said member, said inner cylinder being closed by a wall at its upper end and connected at its upper end to said secondary guides and at its lower end to the adjacent end of the outer cylinder, whereby said inner and outer cylinders are movable endwise as a unit on said tubular member, a collar mounted within said intermediate cylinder adjacent its upper end, said intermediate cylinder extending upwardly beyond the upper end of said outer cylinder and operatively connected with said support, said member at its upper portion being formed with a fluid flow port to provide communication with the space between said member and said inner cylinder and said inner cylinder being provided with a fluid flow port to provide communication with the space between said inner cylinder and said intermediate cylinder, a source of supply of fluid under pressure having a valve controlled connection with said tubular member for supplying fluid thereto for flow through said member and through said ports, the supplied pressure on said collar serving to initially move said intermediate cylinder upwardly and move said support the full length of said secondary guides independently thereof and thereafter the supplied pressure on the end wall for said inner cylinder and said collar serving to move all of said cylinders and said secondary guides upwardly relative to said main guides.

6. A truck as claimed in claim 5 wherein a ring is mounted on the outer wall of said tubular member inwardly of the upper end thereof and above said first mentioned port and said tubular member, above said ring, is formed with a separate fluid flow port to provide fluid communication from said tubular member to the space between the latter and said inner cylinder above said ring.

CLARENCE W. CHANDA.

No references cited.